United States Patent [19]

Kubota et al.

[11] 4,402,473
[45] Sep. 6, 1983

[54] MANUALLY OPERATED LOCKING DEVICE OF SEAT BELT RETRACTOR FOR VEHICLES

[75] Inventors: Tatsushi Kubota, Okazaki; Mitsuaki Katsuno, Toyota, both of Japan

[73] Assignee: Kabushiki-Kaisha, Tokai-Rika-Denki-Seisakusho, Aichi, Japan

[21] Appl. No.: 245,316

[22] Filed: Mar. 19, 1981

[30] Foreign Application Priority Data

Mar. 24, 1980 [JP] Japan .............................. 55-38562[U]

[51] Int. Cl.[3] ....................... A62B 35/02; B65H 75/48
[52] U.S. Cl. ........................ 242/107.4 A; 242/107.4 R
[58] Field of Search ............... 242/107.4 A, 107.4 B, 242/107.4 R, 107.6, 107.7; 280/806; 297/478, 480

[56] References Cited

U.S. PATENT DOCUMENTS

| 3,323,749 | 6/1967 | Karlsson | 242/107.4 A |
| 3,503,571 | 3/1970 | Martin | 242/107.4 A |
| 3,693,147 | 9/1972 | Seo et al. | 242/107.4 R |
| 3,876,031 | 4/1975 | Stouffer | 242/107.4 R X |
| 4,063,777 | 12/1977 | Takada | 242/107.7 X |
| 4,090,735 | 5/1978 | Czernakowski | 242/107.4 A |

Primary Examiner—John M. Jillions
Attorney, Agent, or Firm—Carroll F. Palmer

[57] ABSTRACT

A conventional type of seat belt retractor having a pendulum control to lock protraction of belt webbing in event of vehicle impact is modified to provide also manual control of webbing protraction by including a lever unit that can engage a pawl of the ratchet wheel mechanism that locks the shaft on which the webbing winds and a coil spring or similar member that resiliently connects the lever unit to the pawl. The modified seat belt retractors are useful in locking baggage, child seats or the like on the vehicle seat.

7 Claims, 9 Drawing Figures

MANUALLY OPERATED LOCKING DEVICE OF SEAT BELT RETRACTOR FOR VEHICLES

BACKGROUND OF THE INVENTION

The invention relates to a manually operated locking device of a seat belt retractor for vehicles where the winding shaft is usually urged to retract the webbing, but automatically prevented from rotating in such a direction as the webbing may be paid out at a time of, for example, a sudden deceleration of a vehicle.

In a seat belt retractor, the webbing is connected at one end to a retractor to be wound by a spring. In an emergency such as a collision or a sudden velocity change of the vehicle, an automatic locking means is actuated by means of an inertia sensing means to prevent the protraction of the webbing from the retractor so as to restrain the occupant in the seat for safety.

In this situation, the webbing is normally allowed to be paid out from the retractor except for the time of the emergency so that the occupant may arbitrarily change driving posture during the normal running of the vehicle.

In this manner, because of the free protraction of the webbing from the retractor during the normal running of the vehicle, in cases where a baggage, an infant or child seat is fastened to the seat by means of said webbing, the baggage or the like becomes liable to give the webbing a stress for gradual protection under the influence of the inertial force developed owing to the starting acceleration, stopping deceleration or centrifugal force at the time of normal turning so that the webbing possibly fails to restrain said baggage or the like in the seat.

OBJECTS

Accordingly an object of the invention is to provide an improved manually operated locking device which can prevent the protraction of the webbing by means of a manual manipulation.

Another object of the invention is to provide a manually operated locking device in which the slack is taken out of the webbing even when said slack is incidentally left in the manually locked position of the winding shaft.

Still another object of the invention is to provide a manually operated locking device in which an indicating means is actuated when the manually operating means is in locked position.

Still further object of the invention is to provide a simple manually operated locking device in structure.

BRIEF DESCRIPTION OF THE DRAWINGS

The manner in which the foregoing and other objects of the invention are accomplished will be apparent from the following description and claims considered together with the accompanying drawings, wherein:

DESCRIPTION OF PREFERRED EMBODIMENTS

Figure 1:
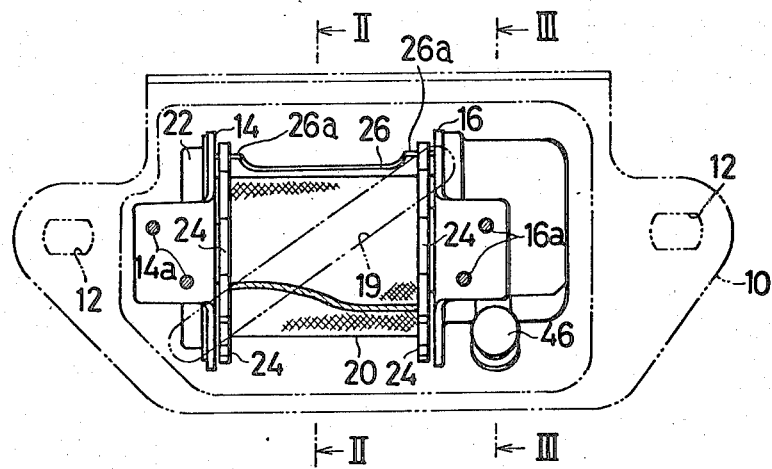
FIG. 1 is a front elevational view of a manually operated locking device according to one embodiment of the invention.

Referring first to FIGS. 1-5 which shows one embodiment of the invention, there is illustrated a bracket 10 having a pair of apertures 12 for a ready mounting on a vehicle body 13. The front face of said bracket 10 is exposed to the interior compartment of the vehicle body 13, while perpendicular to the rear face of the bracket 10, are a pair of mounting plates 14, 16 secured by means of welding, generally represented at 14a, 16a, in parallel spaced relationship. Across said two mounting plates 14, 16, a winding shaft 18 is installed, each end of which is respectively journaled to the central portion of the mounting plates 14, 16 for rotation. A webbing generally indicated at 20, is connected at one end to the winding shaft 18 of the retractor to be wound by a power spring mechanism 22 and leads at the other end into the interior compartment of the vehicle through a slant opening 19 formed in said bracket 10.

A pair of ratchet wheels 24 of a ratchet mechanism 25 are rigidly secured to the winding shaft 18 and positioned at the right and left sides of the webbing 20. Said ratchet mechanism 25 including the ratchet wheel 24, as is well known, comprises a tilting arm 26 having pawls 26a at its two ends which serves as an engagement means. In brief, each end portion of said arm 26 is respectively received into a pair of sector-shaped apertures 28 formed in said mounting plates 14, 16 so that the arm 26 is allowed to rotate within a circumferential angle of the apertures 28.

Figure 2:
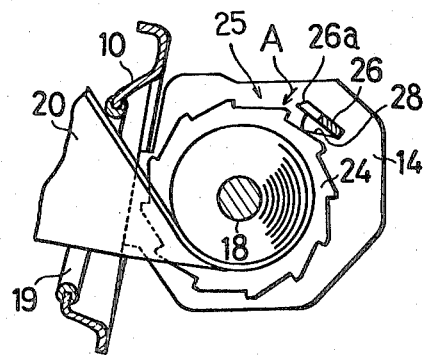
FIG. 2 is a longitudinal cross sectional view along line II—II of FIG. 1.
Figure 3:
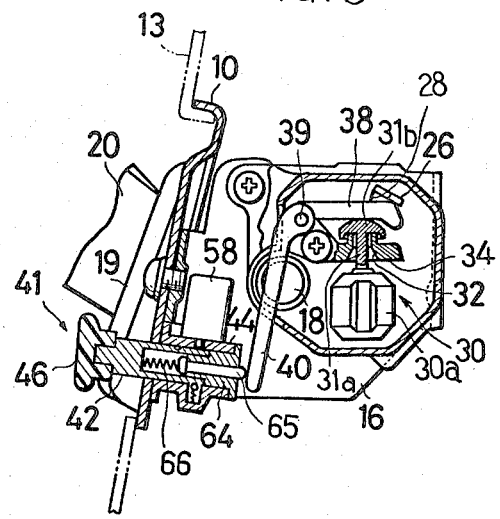
FIG. 3 is a longitudinal cross sectional view along line III—III of FIG. 1.
Figure 4:
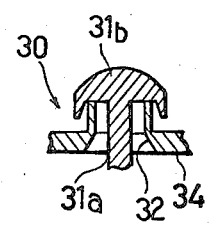
FIGS. 4 and 5 are fragmentary enlarged views of portions of FIG. 3.

The arm 26 is normally in FIG. 2 position so that the pawl 26a is out of engagement with the ratchet wheel 24 under the influence of gravity. A pendulum 30 comprising a weight 30a and a stud 31a having a semi-spherical head 31b is disposed at the right side of the mounting plate 16 to serve as a state-of-art type inertia sensing means as clearly seen in FIGS. 3 and 4. The stud 31a extends clear through the bore of a boss section 32 formed in a horizontal plate 34 rigidly secured to the mounting plate 16. At the upper end of the stud 31a, there is provided the head 31b seated on the boss section 32.

The pendulum 30 is adapted to swing against the plumb line position, when the vehicle is subjected to a change of speed exceeding a predetermined magnitude, for example, at a sudden acceleration so that the head 31b engages a lever 38 to move the lever 38 upwardly so as to serve as an actuating means.

Said lever 38 is formed into inverse L-shaped configuration, the intermediate portion of which is pivoted at the mounting plate 16 for rotation about a pin 39 so that when the pendulum 30 is swung, the rotational movement of the lever 38 is transmitted to the arm 26 to rotate it in the arrowed direction A shown in FIG. 2 so as to move the pawl 26a into engagement with the ratchet wheel 24 for preventing the protraction of the webbing 20. In this manner, said pendulum 30 constitutes a locking means in combination with said ratchet mechanism 25. In regard to the inertia sensing means, it goes without saying that, in place of said pendulum 30, a ball may be employed to be movably mounted on an inverse-conical shaped receptacle or otherwise a suitable falling member may be arranged so as to fall down only when the vehicle is subjected to a change of speed larger than that of a predetermined magnitude.

Figure 5:
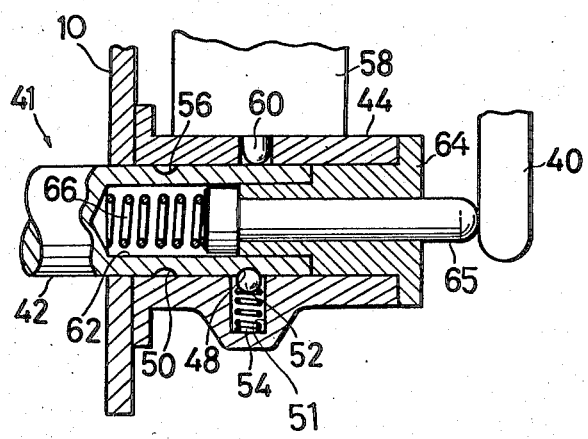

Referring next to particularly FIG. 5 which substantially shows a manually operating system 41, a manually operating member, e.g., a push rod 42 is axially slidably telescoped into a cylinderical guide 44 almost laterally secured to the bracket 10. To one end of said push rod 42 which projects into the interior compartment of the vehicle, knob 46 is attached while in the intermediate portion of said push rod 42, are a pair of recesses 48, 50 axially formed, each of which a spring-loaded ball 52 is to be into and out of engagement. The ball 52 is resiliently urged toward the push rod 42 by a compressive coil spring 54 received in a recess 51 provided in the guide 44.

When the push rod 42 is moved to the right from FIG. 5 position by, for example, the finger push control of the knob 46, the ball 52 interfits the recess 50 to form a locked position of said manually operating system 41. Further, another recess 56 is provided in the outer surface of the push rod 42 positioned on the opposite side of the recess 50 so that an actuator 60 of an indicating switch 58 interfits the recess 50 so as to energize the switch 58 for indication when the push rod 42 is in the locked position as stated above. The other end portion of the push rod 42, positioned on the opposite side of the knob 46, is tubularly shaped to form a hollow section 62 into which a cylindrical boss means 64 is driven, one peripheral end area of which defines a flange to engage the open end of said guide 44 to work as a stopper as seen in FIG. 5. A cap-rod 65 is axially slidably inserted into said boss means 64 to be at all times spring urged by a compressive coil spring 66 disposed within said hollow section 62 in such a direction as the cap-rod 65 engages a extention 40 of the lever 38.

Pursuant to the embodiment of the invention, the webbing 20 may be protracted from the winding shaft 18 through the slant opening 19 to the interior compartment of the vehicle so that the webbing 20 may be fastened to occupant of a seat. In cases where the vehicle is under emergency conditions such as collision at a traffic accident, the vehicle is subjected to an abrupt deceleration to swing the pendulum 30 so that the pawl 26a engages with the ratchet wheel 24 to promptly prevent the rotation of the winding shaft 18. This results in ceasing the protraction of the webbing 20 to restrain the occupant in the seat for safety.

On the other hand, in the event of the normal running of the vehicle, the pawl 26a is out of engagement with the ratchet wheel 24 owing to the fact that the pendulum 30 is along the plumb line so that the occupant may protract the webbing 20 from the winding shaft 18 for the arbitrary change of driving posture.

Still further, it may be that the webbing 20 is employed to fasten a baggage, infant seat or the like to the seat. In this case, under such a relatively small change of speed as when the vehicle begins to start, stop or turns a comparatively mild curve, the pendulum 30 remains stationary instead of swinging so that the webbing is yet allowed to be protracted from the winding shaft 18. As a result, it is possible that the webbing 20 would be loosened for the baggage or the like to drop down from the seat.

For the purpose of avoiding said hazard, the occupant may push the knob 46 and the extension 40 of the lever 38 is by way of the cap-rod 65 rotated about the pin 39 in a counterclockwise direction so that the lever 38 is rotated until said extension 40 moves the pawl 26a into engagement with the ratchet wheel 14, whereby the protraction of the webbing 20 is prevented. In this case, the ball 52 interfits the recess 50 so as to hold a condition in which the push rod 42 pushed the extension 40. This eventually results in preventing the webbing 20 from loosening to secure the baggages or the like against dropping down from the seat.

The situation is such that even if the webbing 20 happens to have been slackened after the push rod 42 is actuated, the ratchet wheel 24 slips on the pawl 26a to rotate in the counter-clockwise direction by the power spring mechanism 25 so that the webbing 20 is retracted to take out the slack of the webbing 20.

Said counterclockwise directed rotation of the ratchet wheel 24 is permitted in the manner as mentioned above, because the lever 38 is allowed to rotate clockwisely about the pin 39 against the biasing force of the compressive coil spring 66 so as to disengage the pawl 26a with the ratchet wheel 24. In this way, the slack is taken out of the webbing 20 even if the slack occurs before the push rod 42 is actuated.

In cases where it becomes unnecessary to hold the winding shaft 18 locked, the finger pull control of the knob 46 permits the push rod 42 to move until the ball 52 interfits the recess 48 so that the lever 38 rotates clockwisely under the influence of gravity to disengage the pawl 26a with the ratchet wheel 24.

The locking operation of the push rod 42 invariably associates with the actuation of the indicating switch 58, so the occupant may perceive the locking condition of the push rod 42 by, e.g., an indication lamp (not shown) even if the push rod 42 been has actuated from an accidental touch of the knob 46.

Figure 6:
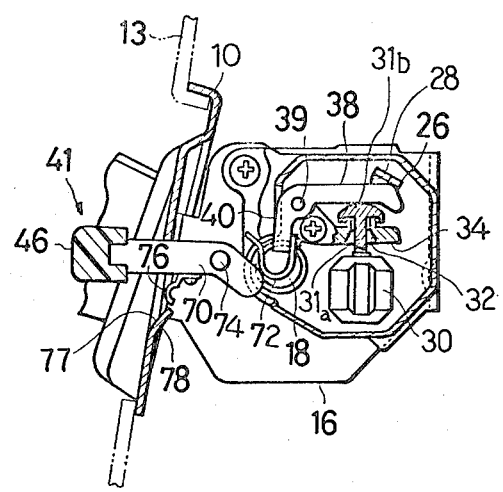
FIGS. 6 and 7 are views similar to FIG. 3 according to other embodiments of the invention.

In reference to FIG. 6 another embodiment of the invention is described hereinafter. In this embodiment of the invention, a lever 70 is employed instead of the push rod 42 and a leaf spring 72 is employed instead of the compressive coil spring 66. The lever 70 is pivoted to the mounting plate 16 by means of a pin 74 for rotation. One end of the lever 70 projects into the interior compartment of the vehicle to secure the knob 46, while the other end of the lever 70 is in engageable relationship with the U-shaped leaf spring 72 in cross section which is fastened to the extension 40 of the lever 38. When the lever 70 is counterclockwisely rotated about the pin 74, the lever 70 pushes the leaf spring 72 so that the lever 38 counterclockwisely rotates about the pin 39 to rotate the arm 26 so as to move the pawl 26a into engagement with the ratchet wheel 24. Associated with the counterclockwise rotational operation of the lever 70, a resilient hook 76 which is secured to the intermediate portion of the lever 70 is adapted to engage a projection 78 projected integrally from the peripheral area of an opening 77 formed in the bracket 10 so as to hold the lever 70 in the locked position.

Consequently, even when the lever 70 is in the locked position the lever 38 is allowed to rotate counterclockwisely by the deflection of the leaf spring 72 so that the slack incidentally occurred in the webbing 20 may be taken out.

Figure 7:
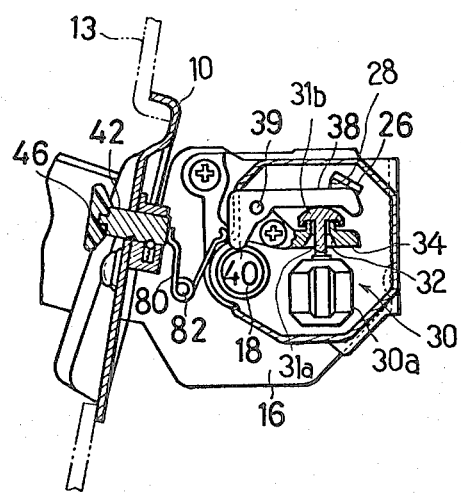

With reference to FIG. 7, still another embodiment of the invention will be described hereinafter. In this embodiment of the invention, instead of the compressive coil spring 66 a torsion coil spring 80 is employed which is mounted on the pin 82. Each end of the spring 80 respectively engages the push rod 42 and the extension 40 of the lever 38. Consequently, the finger push control of the knob 46 rotates the lever 38 counterclockwisely so that the pawl 26a engages the ratchet wheel 24 for preventing the protraction of the webbing 20. In this situation, the slack casually set up in the webbing 20 may be taken out owing to the fact that the lever 38 is allowed to rotate clockwisely by the resilient collapse of the torsion coil spring 80

Figure 8:
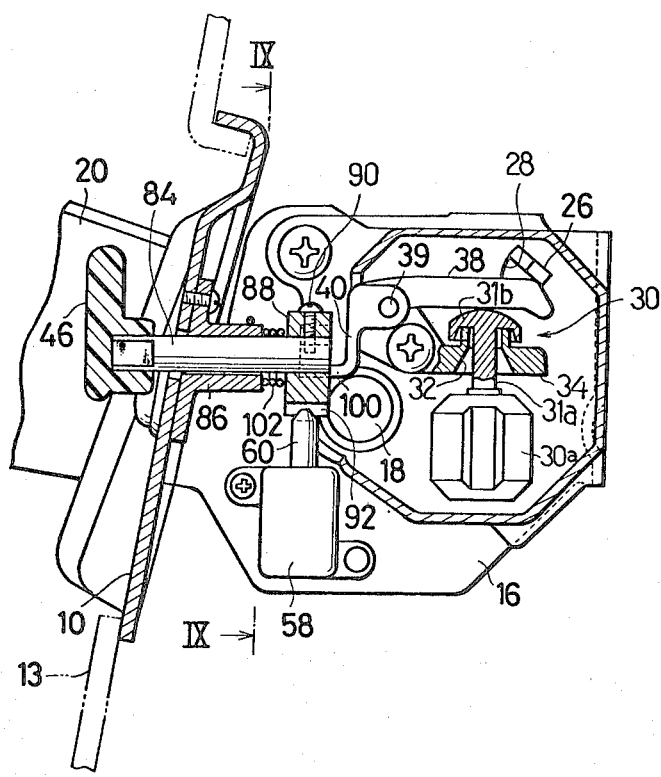
FIG. 8 is an enlarged longitudinal cross sectional view according to still other embodiment of the invention.
Figure 9:
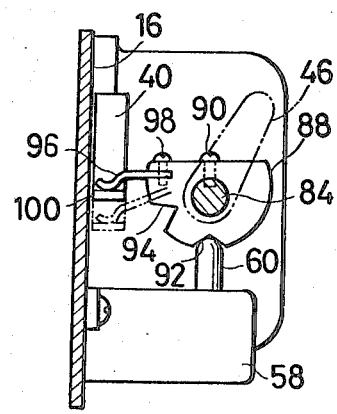
FIG. 9 is a cross sectional view along line IX—IX of FIG. 8.

Now again refering further to FIGS. 8 and 9, another embodiment of the invention will be described. In this embodiment of the invention, in place of the push rod 42, is an operational axle 84 employed which is rotatably journaled in a bearinglike sleeve 86 fixedly secured to the bracket 10. One end of said operational axle 84 projects into the interior compartment of the vehicle with the knob 46 secured thereon, while to the other end of said axle 84 a semi-circular cam 88 is secured by means of a screw 90 to position in the proximity of the extension 40 of the lever 38.

In the outer peripheral portion of said cam 88, a pair of notches 92, 94 are formed differently in the cut depth in angularly spaced relationship which the actuator 60 of the indicating switch 58 is adapted to be moved into and out of engagement. A resilient leaf spring 96 is secured at one end to the cam 88 by means of a screw 98 and projects at the other end to be engageable with the angle section 100 formed in the extension 40 of the lever 38. The resilient leaf 96 is at all times exposed to a clockwise rotational force due to a torsion coil spring 102 secured between the bearing-like sleeve 86 and the operational axle 84 as seen in FIG. 8 so that the resilient leaf 96 has a tendency to separate from the angle section 100.

Consequently, pursuant to this embodiment of the invention, when the knob 46 is rotated counterclockwisely against the biasing force of the torsion coil spring 102 until the actuator 60 interfits into the notch 94, the leaf 96 lowers the angle section 100 to counterclockwisely rotate the lever 38 about the pin 39 so that the pawl 26a engages the ratchet wheel 24 for preventing the protraction of the webbing 20. Also in this situation, the resilient leaf 96 functions the same as the compressive spring 66 does so that the lever 38 is allowed to rotate counterclockwisely so as to disengage the pawl 26a with the ratchet wheel 24. This results in redundant slack in the webbing 20 being taken out. And because of the engagement of the actuator 60 with the notch 94, the cam 88 is held in its position for locking, on the other hand, the indicating switch 58 is actuated for indication since the depth of the notch 94 may be designed deeper than that of the notch 92. Moreover it is a matter of course that when the actuator 60 interfits into the notch 92, the cam 88 is held in its position, thus said actuator 60 constitutes a latching mechanism.

According to the invention, as is to be readily understood from the embodiments described previously, the following advantageous effects are obtained. That is to say; even when a baggage, infant seat or the like is fastened to a seat of vehicle by a webbing, actuation of a manually operated locking means prevents the rotation of a winding shaft in such a direction as the webbing is protracted. This results in preventing the baggage or the like from creeping on the seat freely, especially preventing them from dropping from the seat even when the vehicle is under the influence of inertial force at the time of, such as, its starting and stopping or even when the vehicle is subjected to a vibration during normal driving.

Further, the winding shaft of the retractor is allowed to rotate after the manually operated means is actuated to rewind the webbing. Consequently, even in cases where said manually operated means happens to be actuated with the slack of the webbing being incidentally left, the slack will be taken out of the webbing. This consequently obviates a need for provision of a specified discrete member which is for preventing the slack from setting up in the webbing.

Moreover actuation of the manually operated means causes an indicating switch to be actuated so that an occupant could know if said manually operated means is actuated or not.

Still further, a manually operated locking means may be completed in construction by only adding actuating means, resilient means and manually operated means to a conventional emergency locking retractor so that a structually simple and readily manufactured system may be provided.

What is claimed is:

1. In a seat belt retractor having a winding shaft upon which webbing is wound by motor means, inertia sensing means actuated by deceleration of the vehicle installed with said retractor and locking means to prevent said winding shaft from rotating when said sensing means is actuated, said locking means including a ratchet wheel and a pawl pivoted to move from a first position out of contact with said ratchet wheel allowing said wheel to rotate in either direction to a second position in contact with said ratchet wheel that locks said wheel against rotation in the webbing protraction direction while allowing rotation of said wheel in the webbing retraction direction, the improvement which comprises:

a pivoted lever mounted to move from an unlocking position to a locking position associated with said pawl so movement of said lever from said unlocking position to said locking position moves said pawl from said first position to said second position, manually operable latch means mounted for movement to move said lever between said unlocking and locking positions, a mechanical connection between said lever and said latch means comprising a resilient means, said resilient means being structured to apply a biasing force to urge said lever in the direction of said locking position, said force being sufficient to hold said pawl, when said lever is in said locking position, in said second position, but insufficient to cause said pawl when so positioned to prevent said wheel from rotating in the webbing retraction direction.

2. The retractor of claim 1 further comprising switch means to energize an indicator light when said lever is moved from said unlocking position to said locking position.

3. The retractor of claim 1 wherein said resilient means is a hook-shaped spring attached at one end to said lever and said latch means comprises a lever pivoted to engage and disengage the unattached end of said spring.

4. The retractor of claim 1 wherein said latch means comprises a first plunger axially moveable in a bore carried by said retractor, said first plunger being capable of manual movement between said lever locking and unlocking positions, a second plunger axially moveable in a second bore carried by said first plunger, said resilient means is a coil spring positioned in said second bore, one end of said second plunger extends beyond said second bore to engage an end of said lever and said coil spring biases said second plunger toward engagement with said lever.

5. The retractor of claim 4 wherein said first plunger comprises a pair of peripherial indents and said first bore includes a spring biased ball to engage one or the other of said indents upon manual movement of said latch means.

6. The retractor of claim 1 wherein said latch means is rotatably mounted and carries a cam on one end and said retractor includes electric switch means that is energized when said latch means is moved from said lever unlocking position to said locking position.

7. The retractor of claim 6 wherein said cam comprises a pair of peripherial notches of different depth and said switch means comprises an actuator element that interfits one or the other of said notches when said latch means is moved between said unlocking and locking positions.

* * * * *